J. T. QUIGLEY.
FILE OR INDEX EQUIPMENT.
APPLICATION FILED AUG. 1, 1918.

1,413,778.

Patented Apr. 25, 1922.
7 SHEETS—SHEET 4.

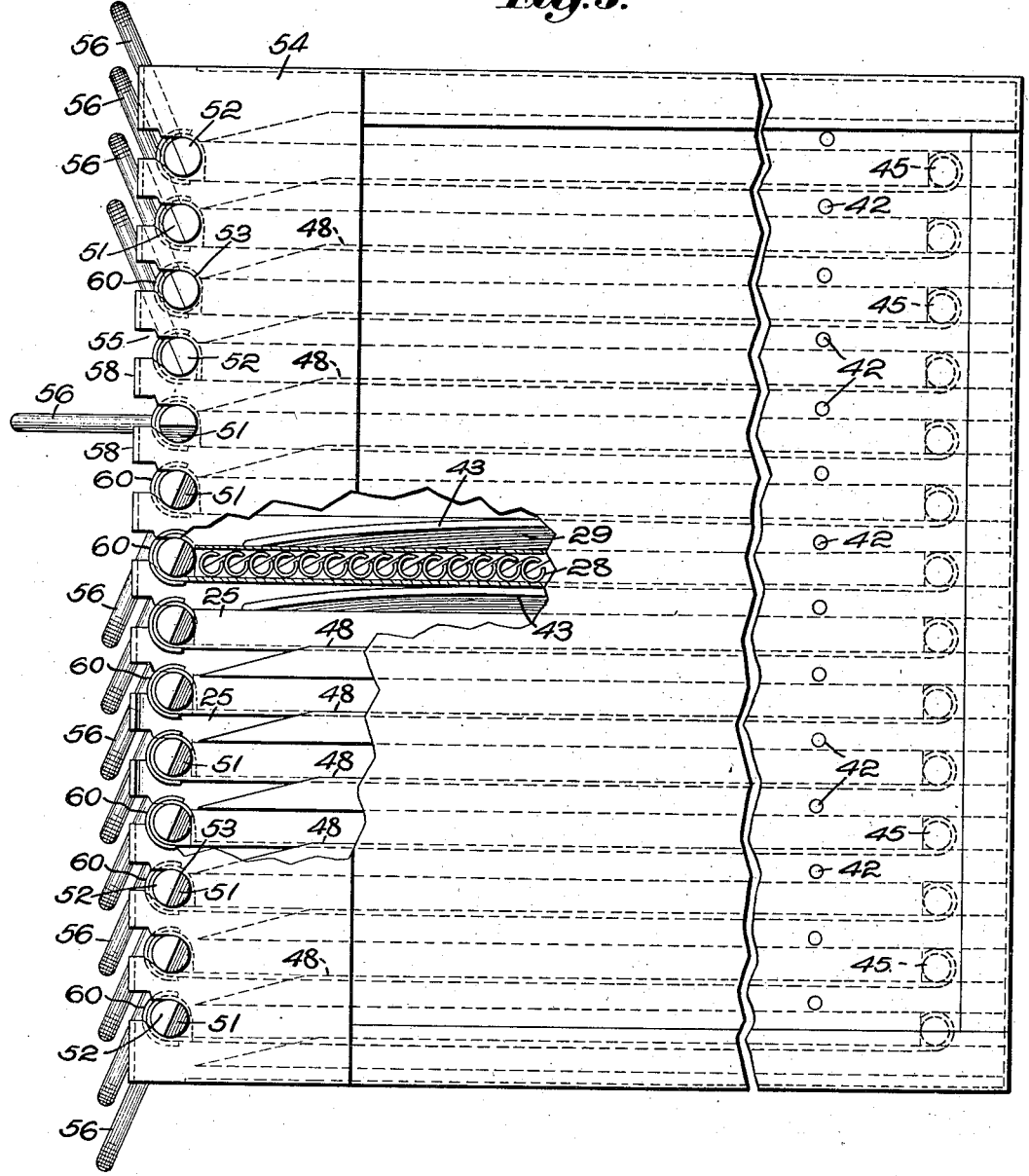

J. T. QUIGLEY.
FILE OR INDEX EQUIPMENT.
APPLICATION FILED AUG. 1, 1918.
1,413,778.
Patented Apr. 25, 1922.
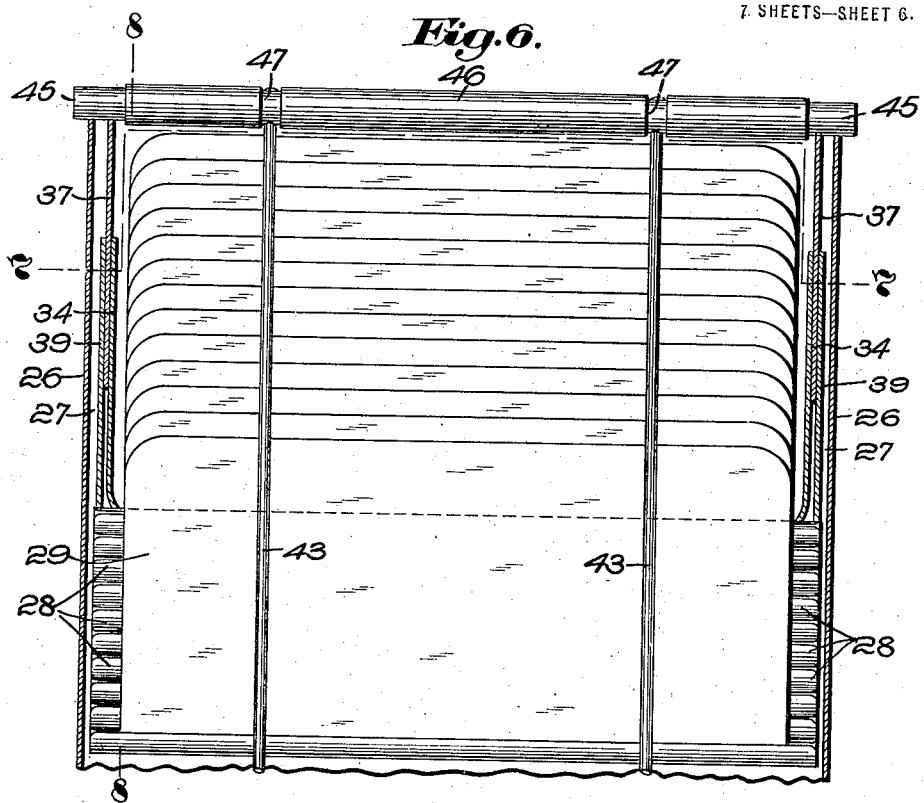
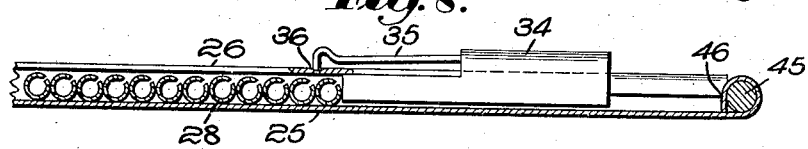
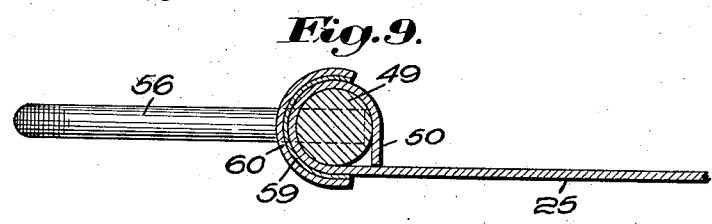
Inventor:
John T. Quigley

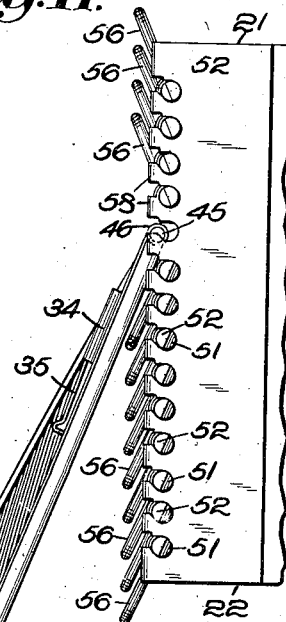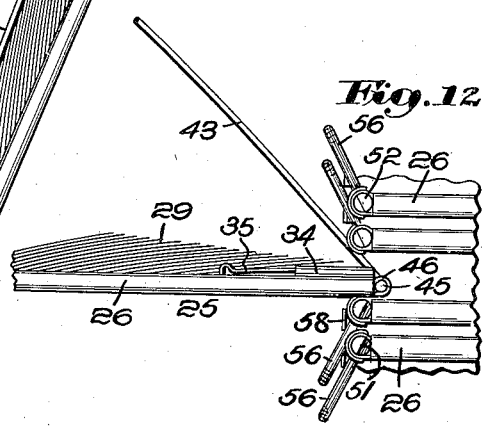

UNITED STATES PATENT OFFICE.

JOHN T. QUIGLEY, OF BOSTON, MASSACHUSETTS, ASSIGNOR TO COSTMETER COMPANY, OF BOSTON, MASSACHUSETTS, A CORPORATION OF MASSACHUSETTS.

FILE OR INDEX EQUIPMENT.

1,413,778.     Specification of Letters Patent.     Patented Apr. 25, 1922.

Application filed August 1, 1918. Serial No. 247,719.

*To all whom it may concern:*

Be it known that I, JOHN T. QUIGLEY, a citizen of the United States, and a resident of Boston, in the county of Suffolk and State of Massachusetts, have invented an Improvement in File or Index Equipments, of which the following description, in connection with the accompanying drawings, is a specification, like characters on the drawings representing like parts.

This invention relates to file and index equipments, and is more especially concerned with devices of this class in which the sheets or cards are arranged in overlapping relation with one another, so that all of their margins are presented for inspection and form a continuous index.

My invention will be best understood by reference to the following description, when taken in connection with the accompanying drawings of one specific embodiment thereof, while its scope will be more particularly pointed out in the appended claims.

In the drawings:

Fig. 5 is a side elevation illustrating the parts in the same position as in Fig. 4, and with a portion of the side walls of the cabinet broken away, to show the guides for the sheet-supports or trays;

Fig. 6 is a detail plan of the rear portion of one of the sheet-supports or trays, with some of the parts shown in horizontal section to illustrate the devices for automatically locking the sheet-holders in the sheet-support or tray;

Fig. 7 is a detail sectional view on line 7—7 of Fig. 6;

Fig. 8 is a detail sectional view on line 8—8 of Fig. 6;

Fig. 9 is a detail sectional view on an enlarged scale on line 9—9 of Fig. 3, illustrating the label-holder and label for identifying one of the sheet-supports or trays;

Fig. 10 is a front elevation of the equipment with one of the sheet supports or trays withdrawn and suspended preparatory to inspection or complete removal from the cabinet;

Fig. 11 is a side elevation of the same partly broken away; and

Fig. 12 is a detail, vertical sectional view, illustrating the commencement of the introduction of the sheet-support or tray into the cabinet, and showing the sheet-guard being folded down upon the sheets.

Figure 1:
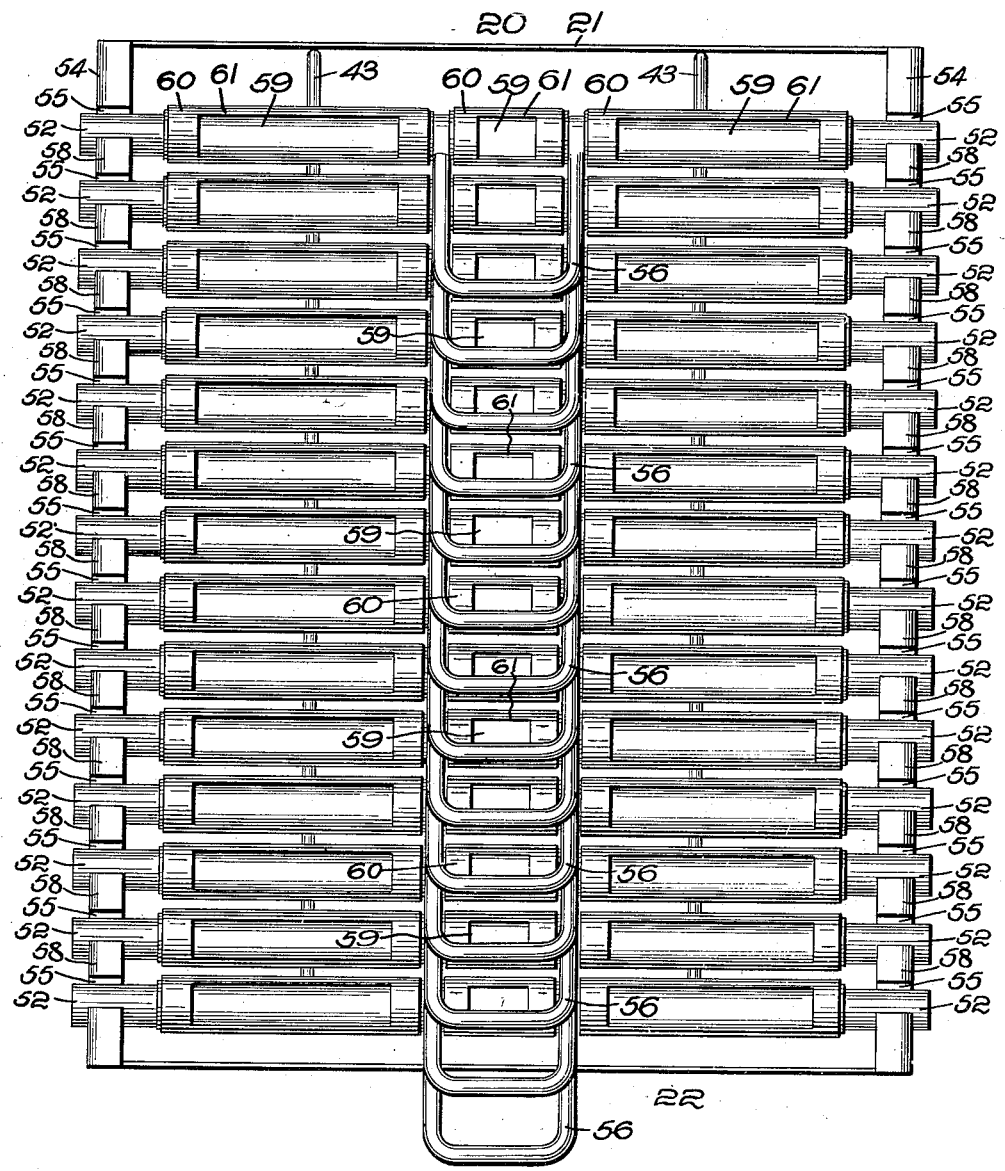
Fig. 1 is a front elevation of a file or index equipment embodying my invention.
Figure 2:
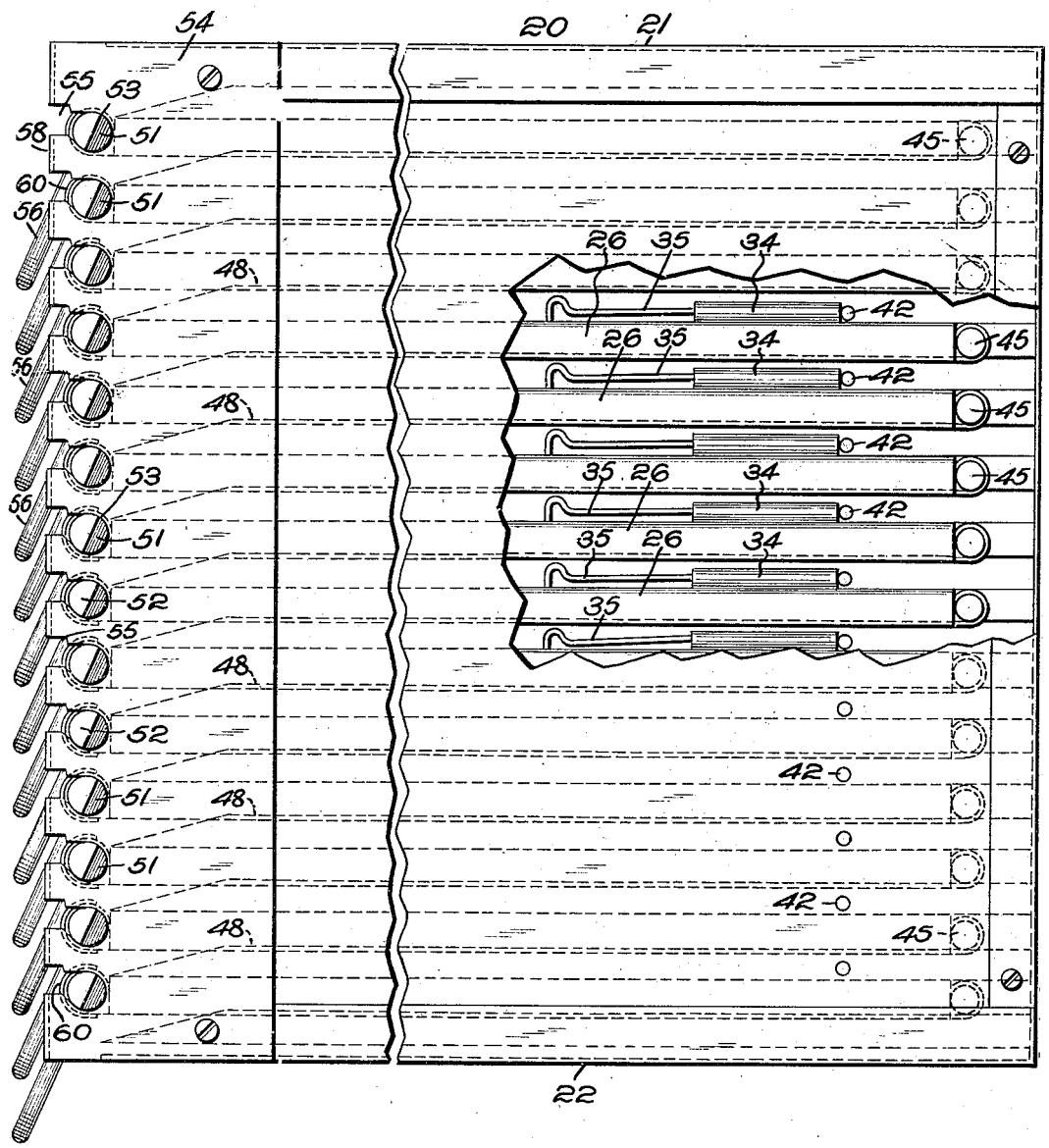
Fig. 2 is a side elevation of the same, partly broken away to save space, and a portion of the side wall of the cabinet being broken away the better to illustrate the means for causing the sheets or cards automatically to be locked in place in the trays when the latter are inserted in the cabinet.
Figure 3:
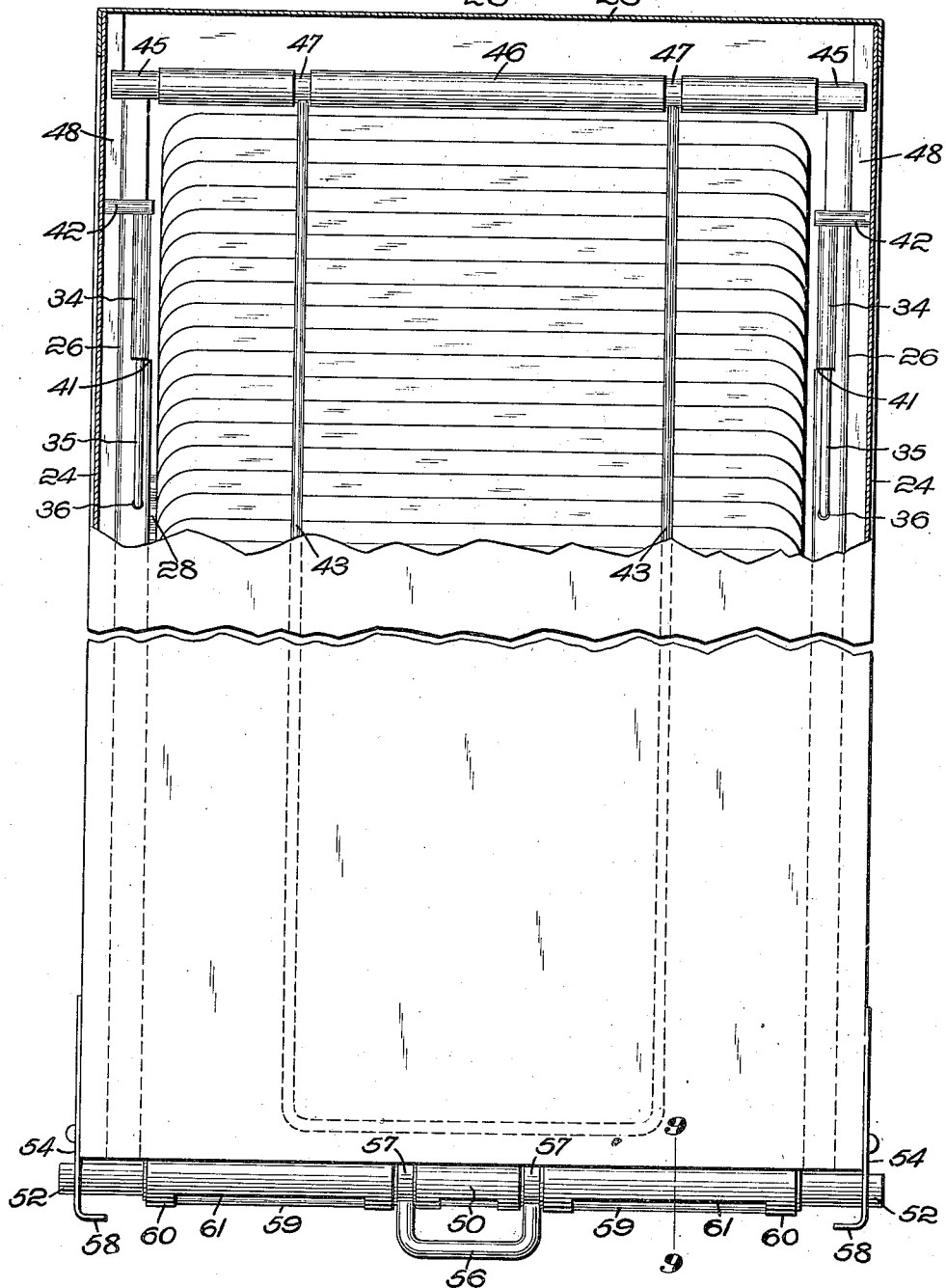
Fig. 3 is a plan of the same, also partly broken away to save space, and a portion of the top of the cabinet being broken away to show the devices referred to in connection with Fig. 2.

Referring to the drawings, and to the file and index equipment which I have illustrated for purposes of exemplification, I have shown an equipment of the class in which the sheets, cards or like elements, are detachably held by sheet-holders or carriers, which are mounted in a mounting or support sometimes called a tray, the latter being in a general way similar to a drawer, several of which are usually provided and held in a suitable cabinet. Referring to Figs. 1, 2 and 3, in the present example, I have shown an equipment comprising a box-like structure constituting a cabinet 20 having a top 21, a bottom 22, a rear wall 23, and a pair of side walls 24, the front however being preferably entirely open, except as the same is closed by the front ends of the sheet-supports or trays when the latter are in place in the cabinet.

Referring to Figs. 16 and 17, I have shown a plurality of sheet-supports preferably in the form of rectangular trays 25, which may be, and are herein, formed of thin sheets of metal, each provided with a pair of marginal, longitudinal flanges 26, bent inwardly toward each other, as best shown in Fig. 16, to form a pair of channels 27 serving as guides to receive the terminal portions of suitable sheet-holders extending transversely of the channels and mounted to slide longitudinally of the latter, but normally held against movement therein by sheet-holder locking means hereinafter described.

Referring to Fig. 10, these sheet-holders may take various forms, but in the present example, I have shown each tray equipped with a plurality of cylindrical tubular sheet-holders 28 to receive sheets, cards, or other similar elements 29.

The sheet-holders may be removed and replaced in various ways, and normally held in their proper positions by different means, but I prefer to employ means whereby the holder which is to be removed can be swung into an oblique position, and one end freed from its channel, whereupon the other end may be withdrawn. To this end, I have herein provided sheet-holder locking means comprising two stops in the channels 27 to limit the movement of the sheet-holders therein. One or both of these stops may be movable out of the path of the sheet-holders, thereby to permit the latter to be shifted lengthwise of the channel. These stops may be of any suitable construction, and otherwise appropriately arranged, but in the present example, I have shown (see Figs. 6, 7 and 8) two stops in the form of slides 34, which are normally held against longitudinal displacement by detents, herein comprising resilient arms 35 carried by the slides and normally engaging depressions 36 in the flanges 26, as best shown in Fig. 8. These slides may be guided in various ways. One convenient way is to provide each of the flanges 26 (see Fig. 7) with a depending guide 37, while the slide 34 is provided with a channel 38 to receive said guide, this being herein accomplished by providing the slide with an upwardly directed flange 39. Thus, the guide 37 is interposed between two walls of the slide 34, and is guided to move lengthwise of the channels 27. Preferably, the depression 36 is made shallow, and rounded or beveled so that by exerting sufficient pressure on the slide, the latter may be released without the necessity of lifting the spring-arms 35 from the depressions. The arms may be conveniently secured to their slides by providing the latter with rolled edges 40, in which the arms are inserted, as best shown in Fig. 7. While the depressions 36 might be relied upon to limit the forward movement of the slides 34, I prefer to provide more positive means in the form of angular corners or shoulders 41 (see Fig. 3), against which the forward ends of the slides normally abut.

It is evident that, by releasing and moving both of the slides 34 in a rearward direction a proper distance, the entire set of sheet-holders may then be displaced lengthwise in the channels 27. This being so, it is evident that, when it is desired to remove a given sheet-holder, the latter can be swung to an oblique position, until one end is clear of its channel, whereupon the other end may be withdrawn from the other channel.

The sheet-holders may be restored to their proper positions by a reversal of the foregoing operation, after which the slides 34 should be pushed forward to their initial positions illustrated in Figs. 3 and 8. One convenient way of accomplishing this without requiring attention or special act on the part of the operator is to make suitable provision, whereby the mere introduction of the tray into its place in the cabinet causes the slides to be restored to their normal positions. A simple and convenient way of accomplishing this is to provide suitable stops, herein in the form of pins 42 best shown in Fig. 3, projecting inwardly from the side walls 24 of the cabinet, said pins being so placed as to form obstructions in the paths of the slides 34, so that when said slides bring up against said pins, further movement of the slides is impossible, and continued movement of the tray results in relative movement of the slides and tray, the slides finally bringing up in their initial positions at the moment when the tray reaches its innermost position.

As a means normally to hold the sheets compactly, and to prevent the sheets of one tray from possible injury by contact with the bottom of the tray above, I have herein provided a sheet-guard which, in the present example, overlies the sheets and is pivoted at one end, preferably the rear end, to the tray, so that it may be swung away from the sheets to release the latter and allow them to be turned to and fro about the axis of their respective holders. One convenient form of sheet guard is best shown in Figs. 16 and 17, and comprises a wire 43, having its terminal portions 44 secured to a shaft 45 mounted in suitable bearings in the tray 25. Herein, the wire is U-shaped, as viewed from the front in Fig. 16, and is somewhat bow-shaped as viewed from the side in Fig. 17. The terminal portions of the wire may be conveniently secured to the shaft 45, as by inserting them in holes provided therefor in the shaft, and then soldering, riveting or otherwise fastening the ends in place. One convenient way of providing bearings for the shaft 45 is to form the tray 25 with a flange 46 best shown in Fig. 8, wrapped about the shaft 45. Slots 47 may be provided in said flange to admit the terminal portions of the wire 43, and allow the latter to swing to and fro about the axis of the shaft 45.

Preferably, the sheet-guard 43 is hinged at the rear end of the tray 25, and preferably, also, the shaft 45 has a sufficiently snug working fit in its bearing in the flange 46 to present sufficient resistance to the turning movement of the sheet-guard, so that the latter will tend to remain in any position in which it is placed. It follows that, when a given tray is introduced into the cabinet with its sheet-guard elevated, the latter will be folded down into its proper place automatically in the manner illustrated in Fig. 18. It should here be noted that the wire 43 is resilient, and hence the sheet-guard acts like a spring, so that when the tray is inserted in the cabinet, the limited space which is provided for the tray results in the guard being pressed down firmly against the sheets; when, on the other hand, the tray is withdrawn, the sheet-guard will spring back to some such position as that illustrated in Fig. 17.

The trays may be supported and guided in the cabinet in various ways, but I prefer to provide guideways on which the trays are slidably and pivotally mounted. One advantage of this arrangement is that the tray, in sliding backward and forward in its guides, is not likely to bind as a drawer is apt to do. Another advantage is that, by the provision of suitable means at the forward end of the cabinet, the selected tray may be drawn out and suspended in the manner illustrated in Figs. 16 and 17. Thus, while the tray is still supported by the cabinet, its contents may be inspected and records made, or sheets removed and replaced, in a most convenient manner. The position of the tray when thus drawn out and suspended is most advantageous in reading the index, since the latter is presented at the best possible angle to the line of vision.

One convenient way of supporting and guiding the tray is to provide the latter with a pair of trunnions adjacent its rear end, and mounted to slide in generally horizontal guideways on the side walls of the cabinet. To this end, in the present example, the shaft 45 (see Fig. 3) is prolonged beyond the sides of the tray, thereby to form trunnions disposed in guideways 48, best shown in Fig. 5. These guideways are merely ledges, which project inwardly from the side walls of the cabinet, and may be formed on or secured thereto in any suitable manner. In the present example, the forward ends of these ledges, as shown at the left-hand side of Fig. 5, are beveled or inclined in a downward direction to facilitate the entrance of the trunnions, although this is not at all necessary, and may be dispensed with if desired.

It should be remembered that the sides of the trays do not run in the guideways, but are separated from the ledges by a sufficient clearance space, shown in Fig. 3, so as to prevent interference. It is intended that the tray shall be supported only at its rear and front ends. The rear end is supported by the trunnions 45, while the front end is preferably supported by means also serving normally to lock the tray in its place in the cabinet. To this end, I have herein provided the front end of each tray with a pair of lateral projections, best shown in Fig. 3, preferably formed by a shaft 49 mounted to turn in appropriate bearings carried by the tray. One convenient way of forming these bearings is by providing the tray with a flange 50, best shown in Fig. 9, wrapped about the shaft. The latter may be suitably equipped at its ends with means normally interlocked with the cabinet, but capable of being released therefrom by rotating the shaft about its axis. To this end, I have herein shown the terminal portions of the shaft slabbed off as at 51, to form eccentrically-disposed projections 52, which, in the present example, are semi-cylindrical, as viewed in Fig. 2. These ends are normally seated in, and held against vertical displacement by, openings 53 provided in plates 54, which may be formed on or secured to the side walls of the cabinet. Preferably, these openings are generally circular and form bearings in which the ends of the shafts turn. Preferably, also, said openings are provided with relatively narrower entrances 55 (see Fig. 2), which are disposed eccentrically, so that when the shaft is rotated through the proper angular distance neccessary to bring the eccentrically disposed projections 52 of the shaft into registration with the entrances 55 of the openings 53, the tray is unlocked as will be evident from an inspection of Fig. 5, wherein I have shown one tray unlocked. The tray may now be withdrawn by exerting a pull in the forward direction upon a suitable handle attached thereto.

Figure 4:
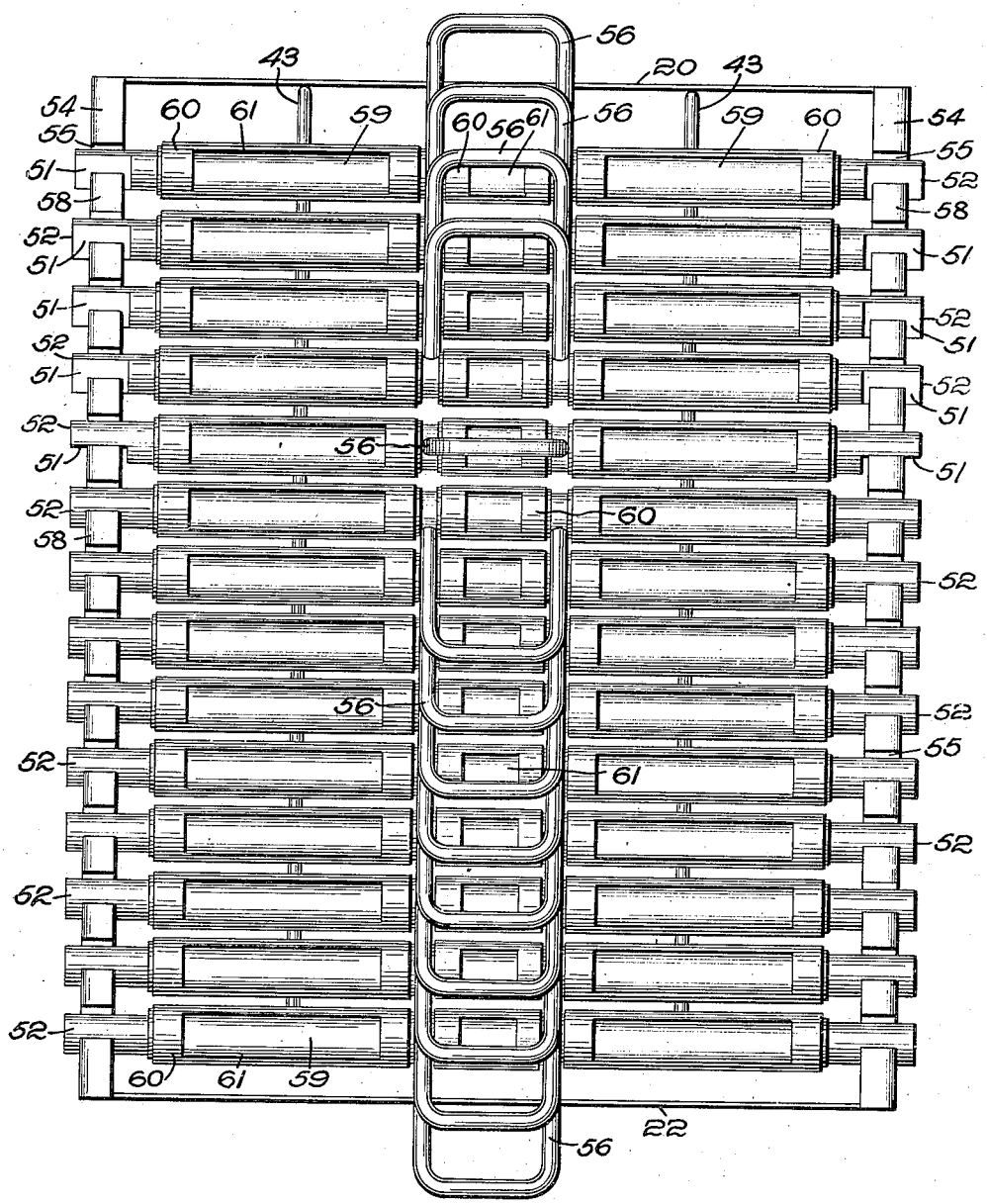
Fig. 4 is a front elevation of the equipment showing the same in readiness for the removal of one of the sheet supports or trays.

In order to simplify the operation of releasing and withdrawing the tray, I prefer to provide a single grasping member or handle, by means of which the shaft may first be rotated into the proper position and the tray then pulled out. Preferably, also, the arrangement is such that, when the user prepares to unlock the selected tray, he unconsciously makes sure that the others are locked, so that they shall not be accidentally withdrawn because of the contact of the trays with one another. To this end, I have herein provided each of the shafts 49 with a handle 56, projecting laterally therefrom, and preferably in a forward direction intermediate its ends, as best shown in Fig. 3. The handle may be, and is herein, generally U-shaped, being formed of a wire whose terminal portions are inserted in and secured to the shaft, and extend through slots 57 in the flange 50, as best shown in Fig. 3. Referring to Figs. 4 and 5, wherein I have shown one tray unlocked, preparatory to removal, it should be observed that its handle is disposed in a horizontal position, while the handles of the trays above are pointed forward, and those of the trays below pointed downward. Any position except an approximately horizontal one ensures the locking of a tray. In selecting a tray for removal, a person will naturally swing the handles of the remaining trays out of the way to afford ample space for the thumb and fingers in grasping the handle of the selected tray, and in so doing, the remaining trays will be locked. This is well illustrated in Fig. 5.

When the tray is withdrawn, it may be either entirely removed from the cabinet, or suspended therefrom. In order to permit the rear end of the tray to be stopped and suspended, I have herein provided suitable stops (see Fig. 3), in the present example in the form of flanges 58 formed on the plates 54, and disposed below the entrances 55 of the openings 53. When the tray is drawn forward, the trunnions at its rear end will bring up against the stops 58 and arrest the forward movement. If it is desired to detach the tray from the cabinet the trunnions are lifted past the stops 58, and can then escape through the entrances 55. When, on the other hand, it is desired to leave the tray suspended, the rear trunnions are simply allowed to drop behind the stops, and since the rear end of the tray will then rest upon the front end of the tray next below, the one which is withdrawn will be suspended in some such position as that illustrated in Fig. 17. When in this position, the sheets may be inspected on both faces, or may be removed, or records made thereon, without removing the sheets, after which the tray may be restored to its normal position by simply lifting its front end and then retracting the same until the trunnions at its front end are seated in the openings provided therefor, when it is again locked.

I preferably provide each tray with identifying means comprising a label 59, shown in cross-section in Fig. 9, wrapped about the generally cylindrical front end of the tray, and secured in place thereon by a labelholder 60, preferably consisting of a plate, the resilient metal correspondingly shaped to clasp the label about the bearing 50, as clearly shown in Fig. 9. An opening 60 is provided in the label-holder, so that the label may be viewed therethrough, as seen in Figs. 1 and 4. When it is necessary or desirable to change a label, this may be conveniently accomplished by pulling the labelholder off the tray by forcible upward movement, which will release its arms from the tray. The label-holder may be restored to its proper position by simply urging it rearwardly with sufficient force to cause its arms to spring apart and clasp the bearing 50, as will be evident from an examination of Fig. 9. Each tray may be provided with one or more labels and label-holders to suit the circumstances, and in Figs. 1 and 4, I have shown each equipped with three.

Having thus described one specific embodiment of my invention, what I claim and desire by Letters Patent to secure is:

1. In a paper file, the combination of a frame presenting a series of parallel guideways, a series of sheet supports receiving sliding and pivotal support from said guideways, and a plurality of series of normally overlapping sheets hingedly mounted on said sheet-supports, respectively, to turn about axes parallel with the pivotal axes of said sheet supports.

2. In a paper file, the combination of a frame presenting a series of pairs of guides, a series of sheet-supports carrying movable pivots guided by and receiving pivotal support from said pairs of guides, respectively, and means to limit the outward movement of said pivots lengthwise of said guides, while still permitting the axis of each pivot to be brought outward beyond the forward ends of the remaining sheet supports.

3. In a paper file, the combination of a frame presenting guideways, a sheet-support, and sliding means guided by said guideways and presenting a pivotal support for said sheet-support, adapted to be positioned outwardly beyond said guideways.

4. In a paper file, the combination of a frame presenting guideways, a sheet-support slidably and pivotally supported by said guideways, and means to limit the outward travel of said sheet support with reference to said guideways and to provide a fulcrum for said sheet-support outwardly beyond said guideways when said sheet-support is drawn out to such limit.

5. In a paper file, the combination of a frame, and a sheet-supporting tray having its rear portion pivotally and slidably mounted in said cabinet, said frame presenting, forward of the normal position of the front end of said tray, a pivotal support for the rear portion of said tray when drawn out and presenting a support for the front portion of said tray when in its normal position in said frame.

6. In a paper file, the combination of a frame, a sheet-support therein, and sheetsupport locking means having provision for unlocking said sheet-support and withdrawing the same from said frame.

7. In a paper file, the combination of a frame, a plurality of sheet-supports therein, and sheet-support locking and unlocking means having provision to unlock one of said sheet-supports and lock the remaining sheet-supports preparatory to the removal of the one which is unlocked.

8. In a paper file, the combination of a frame, a plurality of sheet-supports therein, and sheet-support retaining means having provision to permit one sheet-support to be withdrawn and the remaining sheet-supports held against withdrawal.

9. In a filing or indexing equipment, the combination of a cabinet, a plurality of sheet-supports therein, and sheet-support locking and unlocking means including a plurality of shafts carried by said sheet-supports, respectively, and swinging operating handles secured to said shafts, respectively, and arranged to overlie one another when in locked position.

10. In a filing or indexing equipment, the combination of a plurality of sheet-holders, a mounting therefor, a support for said mounting, and means operated by relative movement of said mounting and support to lock said sheet-holders in said mounting.

11. In a filing or indexing equipment, the combination of a plurality of sheets, a mounting therefor, a support for said mounting, and means operated by relative movement of said mounting and support to lock said sheets in said mounting.

12. In a filing or indexing equipment, the combination of a plurality of sheet-holders, a mounting therefor, sheet-holder locking means carried by said mounting, a support for said mounting, and means on said support cooperating with said locking means to cause the latter to lock said sheet-holder in said mounting.

13. In a filing or indexing equipment, the combination of a plurality of sheet-holders, a mounting provided with a pair of channels in which opposite ends of said sheet-holders are mounted to slide lengthwise of said channels, means normally to limit such sliding movement, a support for said mounting, and means operated by relative movement of said mounting and support to restore the first-mentioned means to its normal position if displaced therefrom.

14. In a filing or indexing equipment, the combination of a plurality of sheet-holders, a mounting provided with a pair of channels in which opposite ends of said sheet-holders are mounted to slide lengthwise of said channels, a pair of stops normally to limit such sliding movement, a support for said mounting, and means operated by relative movement of said mounting and support to restore said stops to their normal position if displaced therefrom.

In testimony whereof, I have signed my name to this specification.

JOHN T. QUIGLEY.